United States Patent
Sipe

(10) Patent No.: US 6,311,444 B1
(45) Date of Patent: Nov. 6, 2001

(54) LIGHTWEIGHT CONCRETE MASONRY UNIT

(75) Inventor: John F. Sipe, New Holland, PA (US)

(73) Assignee: Martin Limestone, Inc., Blue Bell, PA (US)

( * ) Notice: Subject to any disclaimer, the term of this patent is extended or adjusted under 35 U.S.C. 154(b) by 0 days.

(21) Appl. No.: 09/465,756

(22) Filed: Dec. 17, 1999

(51) Int. Cl.$^7$ ...................................................... E04B 1/74
(52) U.S. Cl. ........................ 52/405; 52/309.12; 52/612; 52/575; 52/576
(58) Field of Search ............................ 52/405, 612, 575, 52/576, 309.12; 106/713

(56) References Cited

U.S. PATENT DOCUMENTS

| | | | |
|---|---|---|---|
| 4,040,852 | 8/1977 | Jones | 106/97 |
| 4,052,220 | 10/1977 | Turpin, Jr. | 106/90 |
| 5,196,620 | 3/1993 | Gustin et al. | 588/257 |
| 5,245,810 | * 9/1993 | Foss | 52/405 |
| 5,472,499 | 12/1995 | Crocker | 106/672 |

OTHER PUBLICATIONS

Standard Specification for Lightweight Aggregates for Concrete Masonry Units, ASTM, Designation C331–94, pp. 53–55.

Standard Specification for Loadbearing Concrete Masonry Units, ASTM, Designation C90–97, pp. 17–21.

"Fire Resistance Rating of Concrete Masonry Assembler", Fire Resistnce, TEK 7–1, National Concrete Masonry Association (1993).

"R–Values of Multi–Wythe concrete Masonry Walls", Energy & IAO, TEK 6–1A, National Concrete Masonry Association (1995).

Natural Pumice, Material Safety Data Sheet (OHSA 29 CFR 1910.1200).

Liquid Color Pigments, Material Safety data Sheet, M. Hamburger & Sons, Inc., King of Prussia, Pa., Nov. 20, 1985.

Rheomix Rheopel, Material Safety Data Sheet, Master Builders, Inc., Cleveland, Ohio, Oct. 1, 1997.

Rheomix 610P, Material Safety Data Sheet, Master Builders, Inc., Cleveland, Ohio, Oct. 1, 1997.

* cited by examiner

Primary Examiner—Beth A. Stephan
Assistant Examiner—Patrick J. Chavez
(74) Attorney, Agent, or Firm—Jacobson Holman, PLLC

(57) ABSTRACT

The lightweight concrete masonry unit of the present invention contains, before being mixed with water, about 11 to 11.5% by weight of cement, about 47 to 47.5% by weight of pumice lightweight aggregate, about 22.5 to 23% by weight of other aggregate, about 18 to 18.5% by weight of sand, liquid color pigment as required to provide a desired color, and liquid admixture(s) as required to meet water impermeation standards.

7 Claims, No Drawings

LIGHTWEIGHT CONCRETE MASONRY UNIT

BACKGROUND OF THE INVENTION

1. Field of the Invention

The invention relates to lightweight concrete masonry units.

2. Description of the Related Art

Concrete masonry units are specified as width by height by length (w×h×l). The overall dimensions of concrete masonry units are accurate to plus or minus one-eighth inch. These dimensions vary with different manufacturers and project requirements and there are a variety of configurations of concrete masonry units. A typical masonry unit has a nominal face size of 8" high×16" long (7⅝"×15⅝" actual)×thickness indicated.

Units may be manufactured with two or three cores, straight ends (typical of corners), or with ears or flanges. Unit configurations vary with local preferences for placing units; manufacturing equipment and processes; concrete mixes; and product performance requirements.

Split-face concrete masonry units provide an appearance of natural stone. The units are typically manufactured as two units connected together as one. Equipment splits or fractures the one unit into two separate blocks and the "face" or visible side of the unit then has a unique texture created by the random breakage of the face area and by fracturing of aggregates in the unit mix.

The units are typically available in a variety of colors, sizes, and configurations. Additionally, units may be scored, ribbed or fluted for additional accents patterns.

Architectural concrete masonry also includes smooth-face or "matte face" units. These units are not split as described above and therefore have a smooth, flat appearance. These are also produced in a variety of configurations, sizes, and colors.

The standards for lightweight aggregates for concrete masonry units are set forth in ASTM C331. There are three general types of lightweight aggregates, as follows:

(1) aggregates prepared by expanding, pelletizing, or sintering products such as blast-furnace slag, clay, diatomite, fly ash, shale, or slate;

(2) aggregates prepared by processing natural materials, such as pumice, scoria, or tuff; and (3) aggregates consisting of end products of coal or coke combustion.

The aggregates are composed predominately of lightweight-cellular and granular inorganic material.

The standards for loadbearing concrete masonry units are set forth in ASTM C90. The standards relate to hollow and solid concrete masonry units made from portland cement, water, and mineral aggregates with or without the inclusion of other materials. There are three classes of concrete masonry units including lightweight. There are two types of concrete masonry units: (1) Type I, moisture-controlled; and (2) Type II, nonmoisture-controlled. These units are suitable for both load-bearing and nonloadbearing applications. The moisture content requirements for Type I units are shown in Table 1 of ASTM C90.

Although standard gray lightweight masonry units have been manufactured for many years, there has been a need in the art for a lightweight colored masonry unit. Many lightweight units are expanded shale and slag, but due to the dark gray color of these materials, they are not suitable for production of light-colored masonry units.

An object of the present invention is to provide a lightweight concrete masonry unit with the material weight classification less than 105 pounds per cubic foot.

A further object of the present invention is to provide a lightweight concrete masonry unit which meets all ASTM C90 specifications and achieves stringent water impermeation requirements.

A still further object of the present invention is to provide a lightweight concrete masonry unit which is designed so that a manufacturer can manufacture them in a repetitive manner.

Yet a further object of the present invention is to provide a lightweight, light-colored masonry unit.

BRIEF SUMMARY OF THE INVENTION

The lightweight concrete masonry unit of the present invention contains the following ingredients before being mixed with water:

(1) cement—about 11 to 11.5% by weight;

(2) pumice lightweight aggregate—about 47 to 47.5% by weight;

(3) other aggregate—about 22.5 to 23% by weight;

(4) sand—about 18 to 18.5% by weight;

(5) liquid color pigment—as required to provide a desired color, typically 14 to 17 pounds; and (6) liquid admixture(s)—as required to meet water impermeation standards.

The benefits of the masonry units of the present invention include:

(1) Approximately 25% reduction in the actual weight of the unit. Current colored masonry units typically weigh 40–60 pounds. The new masonry units are in the 30–45 pound range;

(2) Less load weight in building design;

(3) The same strength as other heavier units. The new masonry units meet all ASTM C90 compressive strength requirements;

(4) Improved insulating value. According to the National Concrete Masonry Association TEK Report 6-1A, Table 1, the pumice aggregate raises the standard R-value of the unit;

(5) Improved fire resistance rating. The pumice gives the finished unit a higher fire resistance rating, according to National Concrete Masonry TEK Report 7-1, Table 6.0; and (6) Inherent design makes the units less susceptible to water permeation compared to other lightweight units. The units not only achieve the lighter weight, but also achieve a higher water impermeation standard. The mix design and ingredients of the units inhibit water from wicking through the block's faceshell and reaching the interior of the wall. Unlike other lightweight units that inhibit water permeation through application of surface-applied sealants, the present units achieve this by their inherent characteristics. Surface sealants are subject to improper application and natural deterioration over time; therefore, the inherent water impermeation qualities of the present units make them a unique lightweight unit.

The present product improvements will benefit the end user—the masonry contractor laying the masonry units in the wall. The lighter weight will mean increased speed of installation resulting in greater efficiency of the mason and lower wall costs for the building owner. In addition, the lower weight will likely mean lower Workers Compensation costs for the masonry contractor due to less physical stress on the contractor's employees while handling these lighter units. The units will be marketed primarily to architects, building owners, commercial builders, and masonry contractors.

DETAILED DESCRIPTION OF THE INVENTION

The present invention relates to a true lightweight concrete masonry unit (e.g., split-face) with the material weight classification less than 105 pounds per cubic foot. The unit meets all ASTM C90 specifications and achieves stringent water impermeation requirements. Additionally, these lightweight units are designed so that they can be manufactured in a repetitive manner.

Although the present assignee has been manufacturing standard gray lightweight masonry units for many years, this was the first attempt at making a lightweight light-colored masonry unit. Existing lightweight units use expanded shale and slag, but, due to the dark gray color of these materials, they are not suitable for production of light-colored masonry units.

The present invention uses a light-colored lightweight aggregate, i.e., pumice. Pumice is an imported, eggshell white lightweight aggregate, which meets all required standards of ASTM C331, the national standard specification for lightweight aggregates for concrete masonry units. The pumice has a dry rodded unit weight of 55 lbs./cubic foot and zero organic impurities. The basic composition is volcanic ash, typically containing variable quantities of other materials such as feldspar, biotite and hornblends. The preferred natural pumice is commercially available from Tarmac Mid-Atlantic, Inc., Chesapeake, Va., having a size range from 0 to 8 mm.

Initially, it was felt it would not be possible to create a truly lightweight colored masonry unit that met stringent impermeation standards. It was felt the unit density that would be necessary to meet stringent impermeation standards would cause the block unit weight to fall in the middleweight classification as determined by ASTM standards (units greater than 105 pounds per cubic foot). However, after testing, a satisfactory mix design was determined that passed the stringent water impermeation standards.

The water impermeation standards require all architectural block be designed and manufactured with a material density that will inhibit the migration of moisture to the inside of the wall. This density is verified by placing a two-inch diameter tube that is six inches high attached to a water-resistant base on the face of the block. Two hundred fifty milliliters of water is poured into the tube. At the end of one hour one hundred milliliters of water must remain for the block to pass the permeation requirements. This is the equivalent of the block resisting a wind driven rain of 62.5 mph.

In order to test for ASTM C90 specifications, including linear drying shrinkage, three (3) 8"×8"×16" hollow (2-core) split face pumice masonry units were tested in accordance with ASTM Method of Test Designation C426 for drying shrinkage. The results are as follows:

| Unit No. | Mositure Content (Percent) |
|---|---|
| 1E | 31 |
| 2E | 35 |
| 3E | 34 |
| Avg. | 33 |

Drying Shrinkage (ASTM C426)

| Unit No. | 1E | 2E | 3E |
|---|---|---|---|
| Weight in lbs. (48 hrs. in water) | 31.00 | 32.00 | 36.90 |
| Length in inches (48 hrs. in water) | 10.0071 | 9.9984 | 9.9738 |
| 120 hrs. drying | | | |
| loss in wt. (lbs.) | 1.59 | 1.77 | 1.68 |
| loss shrinkage (%) | 0.035 | 0.038 | 0.028 |
| 168 hrs. drying | | | |
| loss in wt. (lbs.) | 1.86 | 1.98 | 1.99 |
| loss shrinkage (%) | 0.042 | 0.039 | 0.037 |
| 240 hrs. drying | | | |
| loss shrinkage (%) | 0.042 | 0.040 | 0.038 |
| loss in wt. (lbs) | 2.37 | 2.35 | 2.44 |
| 288 hrs. drying | | | |
| loss in wt. (lbs.) | 2.39 | 2.37 | 2.46 |
| loss shrinkaqe (%) | 0.043 | 0.040 | 0.039 |

Avg. wt. Loss (lbs.)=2.41

Avg. loss shrinkage (%)=0.041

Thus, the tests showed all units in compliance with ASTM C90 Table 1 moisture content requirements for Type 1 units.

The preferred product contains the following ingredients:

(1) cement—about 11 to 11.5% by weight;

(2) pumice lightweight aggregate—about 47 to 47.5% by weight;

(3) other aggregate—about 22.5 to 23% by weight;

(4) sand—about 18 to 18.5% by weight;

(5) liquid color pigment—about 14 to 17 pounds;

(6) liquid admixture—RHEOMIX RHEOPEL—about 87 to 103 ounces; and (7) liquid admixture—RHEOMIX 610P—about 29 to 34 ounces.

The liquid admixtures are available from Master Builders, Inc., Cleveland, Ohio.

The "other aggregate" typically is:

(1) Valley Forge rice—this is a manufactured coarse quartzite aggregate that is ¼" or smaller in size available from Valley Forge Stone quarry, Honey Brook, Pa.; and (2) Genstar #10—this is a manufactured fine quartz calcite aggregate that passes through a mesh screen #16 (sieve opening size on screen #16 is 0.0469 inch). This aggregate is commercially available.

The liquid color pigment is typically from the product class iron oxide, carbon, titanium, manganese and chromium and is commercially available from M. Hamburger & Sons, Inc., King of Prussia, Pa. 19406.

The RHEOMIX RHEOPEL commercial product is an aqueous fatty acid salt dispersion containing minor quantities of calcium stearate and calcium palmitate. It is an opaque white liquid with a fatty odor having a pH of 8.5.

The RHEOMIX 610P commercial product is an aqueous surfactant mixture containing nonylphenoxypoly (ethoxyethanol). It is a clear, pale yellow to amber liquid, with no odor and a pH of 11.0

Current colored masonry units weight 40–60 pounds. The new masonry units are in the 30–45 pound range. Thus, the masonry units of the present invention provide an approximately 25% reduction in the actual weight of the unit. This reduction in actual weight will contribute to less load weight in building design.

The masonry units of the present invention have the same strength as other heavier units. More specifically, the new masonry units meet all compressive strength requirements of ASTM C90.

Another benefit of the present invention is improved insulating value. According to the National Concrete Masonry Association TEK Report 6-1A, Table 1, the pumice aggregate raises the standard R-value of the unit.

A further benefit of the present invention is an improved fire resistance rating. The pumice gives the finished unit a higher fire resistance rating, according to National Concrete Masonry TEK Report 7-1, Table 6.0.

The inherent design of the masonry units makes the units less susceptible to water permeation compared to other lightweight units. The units not only achieve the lighter weight, but also achieve a higher water impermeation standard. The mix design and ingredients of the units inhibit water from wicking through the block's faceshell and reaching the interior of the wall.

Unlike other lightweight units that inhibit water permeation through application of surface-applied sealants, the present units achieve this by their inherent characteristics. Surface sealants are subject to improper application and natural deterioration over time; therefore, the inherent water impermeation qualities of the present units make them a unique lightweight unit.

The present product improvements will benefit the masonry contractor laying the masonry units in the wall. The lighter weight will mean increased speed of installation resulting in greater efficiency of the mason and lower wall costs for the building owner. In addition, the lower weight will mean less physical stress on the contractor's employees while handling these lighter units.

The invention is not limited to the specific embodiments described, but only as defined in the appended claims.

I claim:

1. A molded, integral and lightweight concrete masonry unit having two sides including a faceshell and two ends, comprising, when mixed with water:

cement;

pumice lightweight aggregate;

other aggregate;

sand; and liquid admixture;

a formed integral masonry unit having water impermeation qualities to inhibit wicking through the faceshell; and a material weight of the formed integral masonry unit being less than 105 pounds per cubic foot and having a light color.

2. The lightweight concrete masonry unit of claim 1 which is designed to be manufactured in a repetitive manner.

3. The lightweight concrete masonry unit of claim 1 wherein the unit is split-face to provide an appearance of natural stone at the faceshell.

4. The lightweight concrete masonry unit of claim 1 wherein the pumice has a dry rodded unit weight of 55 lbs./cubic foot and zero organic impurities and is primarily volcanic ash.

5. A molded, integral, light colored and lightweight concrete masonry unit, comprising:

a unitary body having two sides including a front faceshell and a rear face, said unitary body also having two opposed ends extending between and being integral with said front faceshell and said rear face for placement adjacent to ends, respectively, of other ones of said unitary body, said body including cement, pumice lightweight aggregate, other aggregate, sand, and liquid admixtures, said body having integral water impermeation qualities to inhibit water from wicking through the front faceshell in the absence of surface-applied sealants, said body having a uniform material weight less than 105 pounds per cubic foot.

6. The lightweight concrete masonry unit of claim 5 wherein the others aggregate is a combination of coarse quartzite aggregate that is ¼" or smaller, and fine quart calcite aggregate that passes through a mesh screen #16.

7. The lightweight concrete masonry unit of claim 5 wherein the liquid admixtures are an aqueous fatty acid salt dispersion containing calcium stearate and calcium palmitate and an aqueous surfactant mixture.

* * * * *